United States Patent [19]

Des Forges et al.

[11] Patent Number: 4,674,833

[45] Date of Patent: Jun. 23, 1987

[54] CONNECTORS FOR OPTICAL FIBRES

[75] Inventors: Howard A. Des Forges; John B. Gresty, both of Kent; Harivaden A. Parmar, London, all of United Kingdom

[73] Assignee: Leetec Limited, London, United Kingdom

[21] Appl. No.: 776,779

[22] Filed: Sep. 17, 1985

[30] Foreign Application Priority Data

Sep. 18, 1984 [GB] United Kingdom ............... 8423590

[51] Int. Cl.⁴ .............................................. G02B 6/38
[52] U.S. Cl. ................................. 350/96.21; 350/96.20; 350/320
[58] Field of Search ............... 350/96.20, 96.21, 96.22, 350/320

[56] References Cited

U.S. PATENT DOCUMENTS

| 4,047,797 | 9/1977 | Arnold et al. | 350/96.21 |
| 4,155,624 | 5/1979 | Logan et al. | 350/96.21 |
| 4,198,119 | 4/1980 | Uberbacher | 350/96.20 |
| 4,240,695 | 12/1980 | Evans | 350/96.21 |
| 4,355,862 | 10/1982 | Kock | 350/96.20 |
| 4,398,797 | 8/1983 | Wedertz et al. | 350/96.21 |

OTHER PUBLICATIONS

Harper et al, "Fiber-Optic Connector", *IBM Tech. Discl. Bull.*, vol. 21, No. 5, Oct. 1978, pp. 2115–2116.

*Primary Examiner*—John Lee
*Attorney, Agent, or Firm*—Shoemaker and Mattare, Ltd.

[57] ABSTRACT

In a connector, an optical fibre cable is passed through a sub-assembly comprising a crimp body and collet. Then a sub-assembly comprising a threaded shell and ferrule is screwed onto the collet so that its tines are compressed in the ferrule onto the buffer coating of the cable at a location behind an end portion from which the buffer coating has been removed. Thus, the optical fibre passes through a precision hole for its projecting end to be removed by a cleaving blade passed across a slot. Two connectors are fixed to opposite ends of a rigid coupler by coupling nuts to bring opposed fibres into register.

12 Claims, 9 Drawing Figures

CONNECTORS FOR OPTICAL FIBRES

FIELD OF THE INVENTION

This invention relates to a plug connector for providing an end connection of an optical fibre and to a method for forming such a connection.

BACKGROUND TO THE INVENTION

This invention is primarily concerned with the connection of multimode fibres of core diameter typically of 50-200μ which when the cladding is taken into account is 125-400μ. The optical fibres with their so-called buffer or insulating coating have a diameter of up to 1 mm. In the case of polymer clad fibres the diameter may range from 0.5 mm to 1.5 mm. The buffer or secondary coated fibres may be as such or they may be in the form of a so-called ruggedized fibre in which the core is loose in a jacket or is tightly held in the jacket by an intervening layer, e.g. of polyimide ("Kevlar") fibres.

A problem that has existed in the termination of such fibres by means of a connector tip or ferrule has been to avoid the need to fix the fibre into the ferrule by means of an adhesive and then to polish the ferrule. U.S. Pat. No. 4,368,948 (Despouys) teaches the removal of the buffer coating along a predetermined length from one end of the fibre followed by threading the fibre through a connector tip so that a portion of the fibre stripped of its outside sheath is within the connector tip and the remaining stripped portion of the fibre projects from the front end of the connector tip. The connector tip is joined to a portion of the fibre tip still bearing its buffer coating by crimping and a portion of the fibre stripped of its outside sheath and projecting through a spot face of the ferrule at the front end of the counterbore is severed inwardly of the front face of the fibre to provide an optical end face. But we have found that it is difficult to get reliable results by crimping onto the buffer layer because there is a risk of damaging the fibre and creating sources of optical loss. A tool having special crimping jaws set to the size of the fibre is required which increases the equipment to be taken into the field. Furthermore, the connector tip is single use and does not allow repeated terminations to be made reusing the same components.

The use of slotted insert within a crimping ring axially to locate the buffer material of an optical fibre is described in U.S. Pat. No. 4,447,121 (Cooper et al) and the use of a helically slotted conical clamping member to hold and axially locate an optical fibre after its buffer layer has been removed is described in our G.B. Pat. No. 2040062.

SUMMARY OF THE INVENTION

It is an object of the invention to provide a connector that may be reliably fitted to the end of an optical fibre in the field without the use of adhesives and polishing tools.

It is a further object of the invention to provide a connector for fitting to a prepared end of an optical fibre formed in relatively rotatable proximal and distal parts that on simple rotation in a locking direction immobilise the connector on the fibre.

It is a yet further object of the invention to provide a connector for fitting to a prepared end of an optical fibre in which the fibre can be releasably locked in position in the connector and cut to length so as not to interfere with the fibre of a second connector of a spliced joint between fibres.

Broadly stated the invention provides a plug connector for providing a connection to an optical fibre at an end portion thereof from which a buffer coating has been removed to expose the fibre, comprising a proximal portion into which the buffer coated fibre passes and a distal portion including a ferrule formed with a front face defining an abutment plane for the ferrule and having an aperture through which the exposed fibre passes, wherein relative rotation of the proximal and distal portions of the connector engages resiliently flexible clamping means with the buffer coating to locate the fibre axially with respect to the connector and portions of the front face of the ferrule extending over the aperture are relieved to permit the fibre to be severed without its cut end protruding beyond the abutment plane.

The invention further provides a method of providing a connection to an optical fibre which comprises removing buffer coating from an end region of an optical fibre, passing the fibre into a plug connector having relatively rotatable proximal and distal portions so that the buffer coating enters the connector and the exposed fibre protrudes through an aperture in a front face defining an abutment plane of a ferrule, said aperture being centered on the axis of the ferrule, relatively rotating the proximal and distal portions to engage clamping means of said connector with the buffer coating and locate the fibre axially with respect to the connector, introducing a scribing tool into a region of said ferrule extending over the aperture and relieved behind the abutment plane, passing said scribing tool across the fibre to scribe it at an axial position behind the abutment plane and severing the fibre by pulling or bending its exposed portion to give an immediately usable cleaved optical face.

DESCRIPTION OF PREFERRED FEATURES

Very conveniently the exposed end of the ferrule is formed with a diametral slot extending over the precision alignment means, along which slot a sharp cleaving blade can be passed to nick the optical fibre or cladding to enable a clean division to be made in the fibre leaving an exposed cross-section of the fibre at the front of the precision hole.

Preferably the ferrule forms part of a first sub-assembly and the collet forms part of a second sub-assembly, the sub-assemblies being screwed together thereby forcing tines of the collet into the ferrule and closing them onto the buffer coating of the cable.

Two such connectors may be fixed to opposite ends of a rigid coupler by coupling nuts to bring opposed optical fibres into register.

BRIEF DESCRIPTION OF THE DRAWINGS

In order that the invention may be clearly understood and readily carried into effect, a connector for connecting optical fibres coaxially will now be described by way of example, with reference to the accompanying drawings, in which.

DETAILED DESCRIPTION OF PREFERRED EMBODIMENTS

Figure 1:
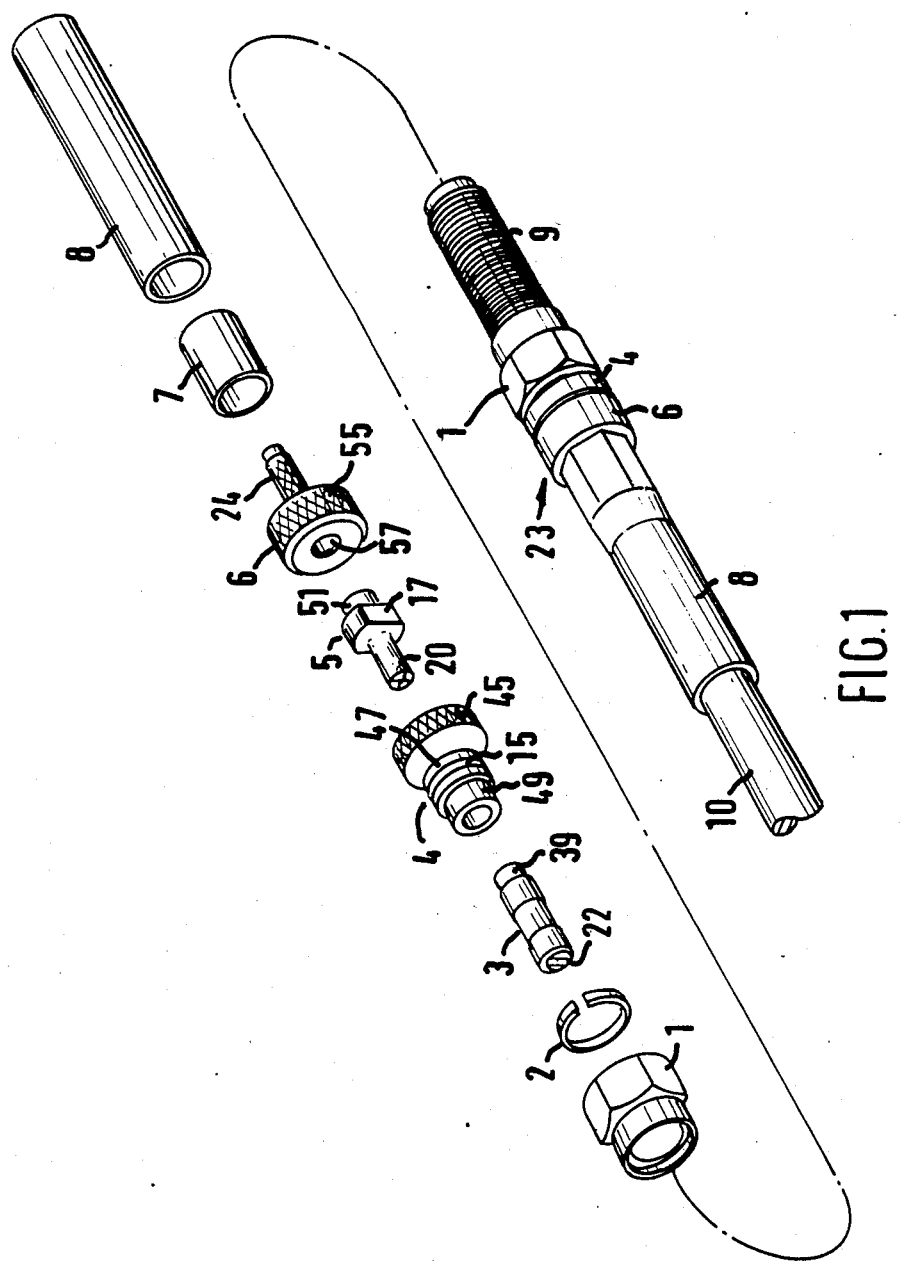
FIG. 1 is a view of a pair of connectors according to the invention, one of which is shown exploded, together with a coupling member.
Figure 2:
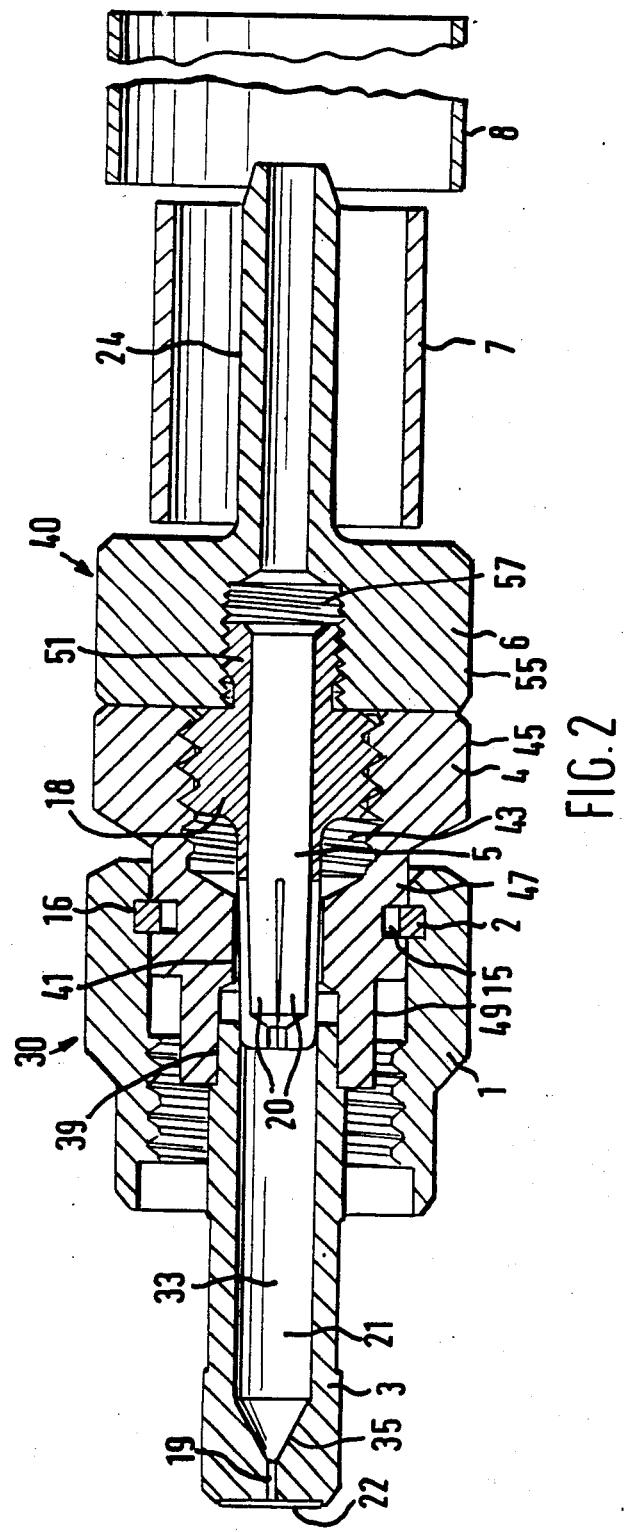
FIG. 2 is a sectional elevation of one of the connectors of FIG. 1 in its assembled state.
Figure 3:
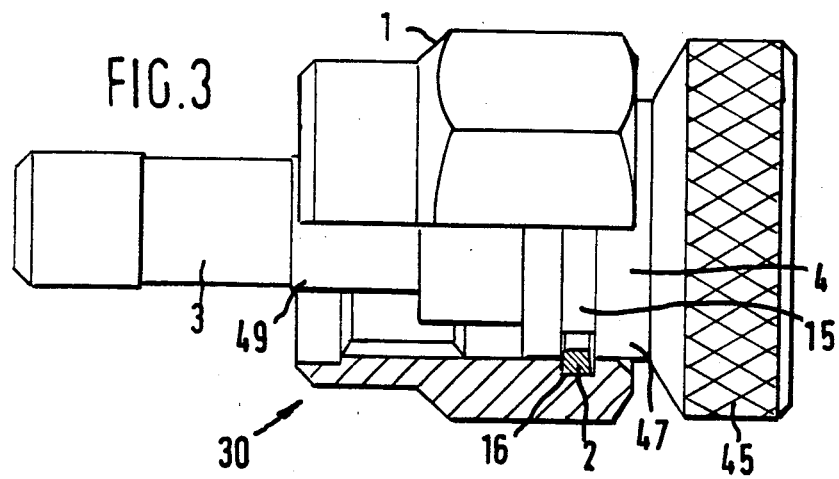
FIG. 3 is an elevation, partly in section, of a first sub-assembly in the assembly of FIG. 2.
Figure 9:
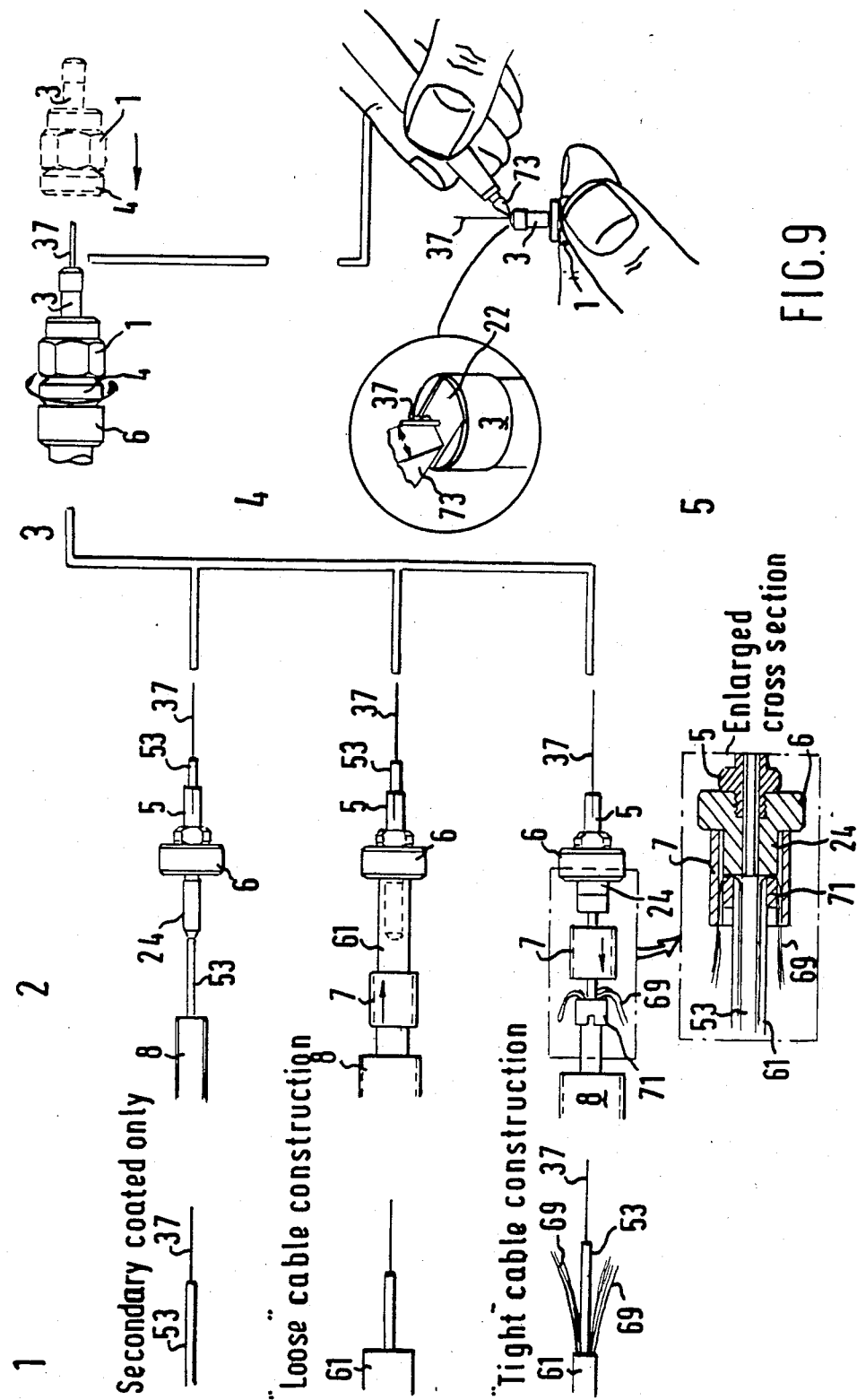
FIG. 9 is a diagram showing the procedure for cable preparation and connector fitting for buffer coated fibres, "loose" cables and "tight" cables with enlarged details showing the cross-section at the rear of the connector with a "tight" cable being fitted and showing a front perspective view of the ferrule during fibre scribing.

In the drawings, a ferrule 3 is formed with an internal bore 33 leading at its distal end via a conical transition region 35 to a fibre exit passage 19 of the same diameter as the outside diameter of the exposed core and cladding 37 (FIG. 9) of the fibre or cable on which the termination is to be formed. In fact the cladding 37 is a slight clearance fit in the exit passage 19 so that the connector can be used with glass clad fibres as well as silicone clad or so called PCS fibres. The proximal end of the ferrule 3 is stepped at 39 to be a permanent press fit into a counterbore at the distal end of an annular shell 4 linked via a small diameter transition region 41 with an enlarged internally threaded proximal portion 43 of the bore. The outer surface of the shell 4 is stepped to define three regions of distally decreasing diameter, the proximal region 45 defining a first thumb wheel, the intermediate region 47 being grooved at 15 and defining a bearing surface for a coupling nut 1 and the distal region 49 fitting with clearance in the nut 1 and carrying the ferrule 3. To form the first sub-assembly 30 (FIG. 3), the ferrule 3 is permanently fitted into the threaded shell 4. A C-clip 2 is then pressed into the groove 15 in the threaded shell 4 and is held in the groove 15 until the coupling nut 1 is brought over the ferrule 3 and threaded shell 4. The C-clip 2 is thereupon released until it is located both in the groove 15 and a groove 16 in the coupling nut 1 so that the coupling nut 1 is rotatably supported on the intermediate region 47 and axially located with respect to the shell 4.

Figure 4:
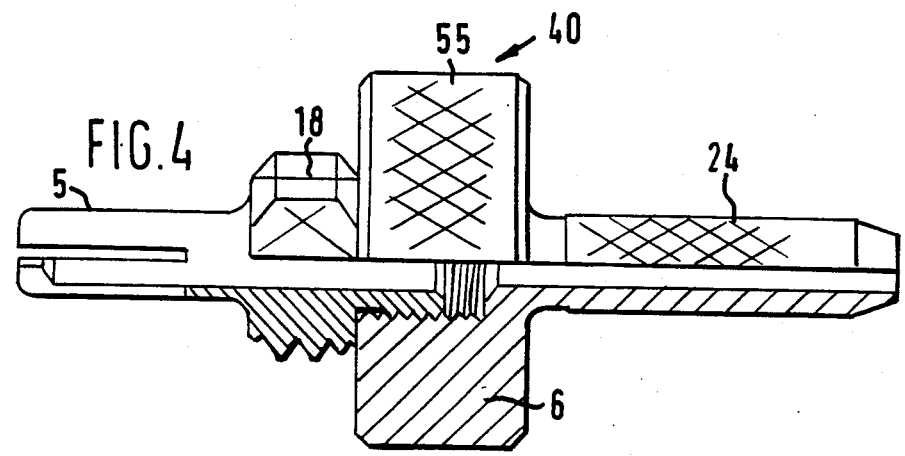
FIG. 4 is an elevation, partly in section, of a second sub-assembly in the assembly of FIG. 3.
Figure 6:
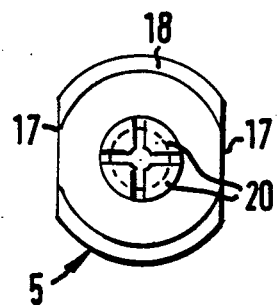
FIG. 6 is an end elevation of the collet body of FIG. 5.
Figure 5:
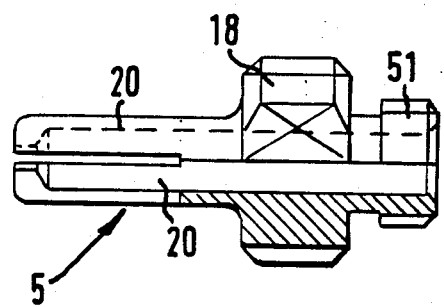
FIG. 5 is an elevation, partly in section, of a collet body.
Figure 7:
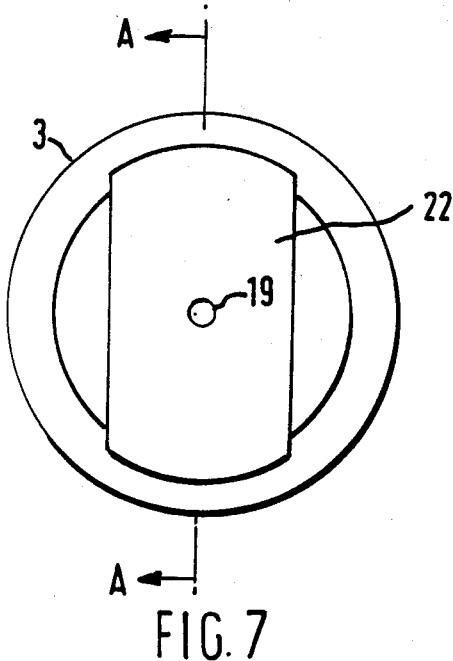
FIG. 7 is an end view of a ferrule.
Figure 8:
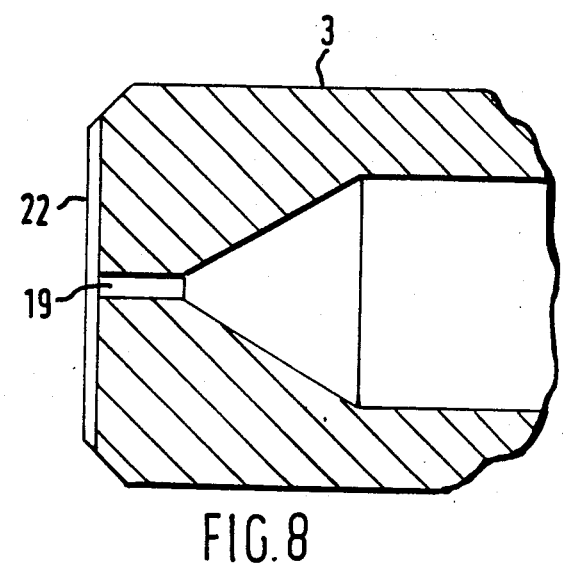
FIG. 8 is a section on line A—A in FIG. 7.

The second sub-assembly 40, FIG. 4, comprises a collet 5 and a crimp body 6. The collet 5 (FIGS. 5 and 6) has tines 20 at its distal end, a larger diameter threaded intermediate region 18 formed with opposed flats 17 (FIG. 6) that is engageable into region 43 of the shell 4 and a smaller diameter threaded proximal region 51. The crimp body 6 has a tubular proximal region 24 whose internal diameter is sufficient to permit passage of a buffer-coated fibre 53 (FIG. 9) leading to a distal region 55 defining a second thumb wheel and formed with a large diameter threaded counterbore 57 into which region 51 of the collet 5 fits. To form the second sub-assembly 40, the collet body 5 is first selected to suit the diameter of the fibre buffer coating 53 of the cable. The collet body 5 is then screwed into the crimp body 6 by means of a small spanner which engages the opposed flat faces 17 (FIG. 6), on the larger screw threaded part 18 of the collet body 5.

Assembly of the connector is begun by stripping the buffer coating 53 from the fibre 37 at an end region thereof which is typically about 15 mm long to expose the fibre and cladding. A heat shrink sleeve 8 is passed onto the fibre 37, 53 over the buffer layer 53 and outer jacket 61 (if present), followed in the case of a "loose" cable by a crimp ring 7. In the case of a "tight" cable containing Kevlar fibres 69 between the buffer coating 53 and the outer jacket 61, the fibres 69 are pushed through a rear crimp body 71, folded back tightly on themselves and then trapped between crimp body 71 and crimp ring 7 which is positioned axially to allow the rear crimp body 71 to butt against the tubular proximal region 24 of crimp body 6 with the crimp ring 7 overlapping the tubular region 24 as shown.

The stripped cable is inserted through the second sub-assembly 40 until the exposed buffer coating 37 protrudes through the distal face of collet body 5 by a length of approximately 5 mm. The length 37 of the optical fibre that is stripped to the cladding surface is threaded through the first sub-assembly 30 until it protrudes through a fibre exit passage 19 in the ferrule 3. The exit passage 19 may be a simple hole or passage as shown. Alternatively it may consist of a bundle of three or more circular-section rods sealed in an aperture in the forward end of the ferrule 3 parallel to the axis of the ferrule 3 with the clad fibre passing centrally through the bundle.

Using finger pressure only, the first sub-assembly 30 is mated with the second sub-assembly 40 by gripping the thumb wheels 45, 55 between thumb and finger and screwing the threaded shell 4 in a clockwise direction onto the larger screw threaded part 18 of the collet body 5 until the proximal face of the threaded shell 4 butts against the distal face of the crimp body 6. By this action, the four tines 20 of the collet body 5 are forced into the internal passage 33 of the ferrule 3 which passage is of such a diameter as to close the four tines 20 down onto the buffer coating 53 of the fibre. This results in the optical fibre being fixed in position in relation to the connector.

The exposed cladding 37 protruding through the fibre exit passage 19 in the ferrule 3 is now cleaved by means of a sharp cleaving blade 73 (FIG. 9), made of a suitable hard material. The cleavage is effected by running the blade along or across a slot 22 (FIG. 9), in the end of the ferrule 3 so as to scribe or nick the cladding of the optical fibre without damaging the core. The cleaving blade 73 is then removed from the slot 22 and the exposed optical fibre 37 is given a sharp flick from the direction in which the nick was made or tension is applied to the fibre 37 resulting in a clean division of the fibre leaving an exposed cross-section of the fibre at the front of the exit passage 19. We have found that if the depth of the slot 22 is about 15–25 microns, the fibre 37 can be cleaved at about 5–10 microns above the slot which is behind the remaining portions of the front face that define an abutment plane when the ferrule 3 is mated with the ferrule of another connector. When the connectors are mated, the optical fibres do not contact one another and damage their optical faces, but the gap between the fibres is sufficiently small for light to pass with little attenuation.

The connector of the invention has the advantage that the properties of the cleaved optical face can be tested after the protruding portion 37 has been cleaved but before any permanently deformable component has been operated on. If the connection is unsatisfactory for any reason, the connector can be disassembled, the end of the fibre prepared afresh, and the assembly repeated until a good connection has been made. With the connectors of the prior art which rely on crimping or resin adhesion, at least the ferrule is wasted each time an unsatisfactory connection is made which increases the overall cost of installating optical cabling. When the connection has been found to be satisfactory, for a buffer coated fibre the heat shrink sleeve 8 is simply brought over the tubular portion 24 and shrunk onto the buffer coating 53 and tubular portion 24 by means of a heat gun to complete the formation of the optical connection. In a "loose" cable the PVC or other outer jacekt 61 is positioned over the tubular portion 24 followed by crimp ring 7 to butt against crimp body 6, after which the crimp ring 7 is closed down onto the outer jacket 61 by compression with a crimping tool to MIL-M-22520/5-05 such as the Daniels Y 19, Buchanan 620293 or ERMA 29021 tool. The heat shrink tube 8 is then brought into position and sealed as before. For a "tight" cable, the crimp ring 7 is closed down onto the rear crimp body 71 and the tubular portion 24, clamping the fibres 69, after which the heat shrink tube is brought into position and shrunk down as before.

To form a junction with another optical fibre, the ferrule 3 is fed through one end of a rigid tubular coupler 9 until the internal thread of the coupling nut 1 engages an external thread on the coupler 9. The engagement is completed by rotating the coupling nut 1 in a clockwise direction. This action is completed when the front face of the threaded shell 4 butts against an internal shoulder of the rigid coupler 9. The junction between the optical fibres is complete when another connector 23 of the same construction is fixed to the rigid coupler 9 from the opposite direction.

The drawings are obviously on an enlarged scale. In practice, one example of the connection is approximately 30 mm long.

The collet 5, when gripping the cladded fibre 53, provides particularly effective cable retention; the fibre is accurately positioned in the connector prior to cleaving the fibre; all parts of the connector, except the crimp ring 7 and shrink tube 8, are rugged and reusable, thereby avoiding costly waste if the initial cleave is not satisfactory; and the connector can provide a dry termination for the cable free from adhesive.

We claim:

1. A plug connector for providing a connection to an optical fibre at an end portion thereof from which a buffer coating has been removed to expose the fibre, comprising a proximal portion into which the buffer coated fibre passes and a distal portion including a ferrule formed with a front face defining an abutment plane for the ferrule and having an aperture through which the exposed fibre passes, wherein relative rotation of the proximal and distal portions of the connector engages resiliently flexible clamping means with the buffer coating to locate the fibre axially with respect to the connector and portions of the front face of the ferrule extending over the aperture as relieved to permit the fibre to be severed without its cut end protruding beyond the abutment plane.

2. A connector according to claim 1, wherein the proximal and distal portions are connected by interengaging threads, carry thumb wheel means by which they may be rotated and enclose a resiliently compressible member arranged to close onto the buffer coating as said portions are screwed together.

3. A connector according to claim 2, wherein the proximal member carries a collet having tines, said tines being forced into a bore in the ferrule as said portions are screwed together and closing onto the buffer coating.

4. A connector according to claim 1, wherein the front face of the ferrule is formed with a diametral slot extending over the aperture to accept a cleaving blade movable across the slot to score cladding of the fibre and enable a clean division to be made.

5. A connector according to claim 1, wherein the distal portion comprises a coupling nut rotatably located on a shell carrying the ferrule.

6. A connector according to claim 1, wherein portions of the proximal portion define a rearwardly facing crimp body for fitting into a sleeve of heat shrinkable material.

7. A connector according to claim 6, further comprising a crimp ring that fits onto the crimp body under the sleeve.

8. A pair of optical fibres spliced by means of a pair of connectors as claimed in claim 1, fastened by coupling nuts to opposite faces of a rigid coupler into which the ferrules fit in abutment with their respective optical fibres in registration.

9. A method of providing a connection to an optical fibre which comprises removing buffer coating from an end region of an optical fibre, passing the fibre into a plug connector having relatively rotatable proximal and distal portions so that the buffer coating enters the connectors and the exposed fibre protrudes through an aperture in a front face defining an abutment plane of a ferrule, said aperture being centered on the axis of the ferrule, relatively rotating the proximal and distal portions to engage clamping means of said connector with the buffer coating and locate the fibre axially with respect to the connector, introducing a scribing tool into a region of said ferrule extending over the aperture and relieved behind the abutment plane, passing said scribing tool across the fibre to scribe it at an axial position behind the abutment plane and severing the fibre by pulling or bending its exposed portion to give an immediately usable cleaved optical face.

10. A method according to claim 9, wherein the scribing tool is passed into a diametral slot formed across the front face of the ferrule and relieved by a distance of 15 to 25 microns from remaining portions of said front face defining an abutment plane, the cleaved face protruding about 5 to 10 microns beyond the slot.

11. A method according to claim 9, wherein relative rotation of the proximal and distal portions serves to force tines of a collet carried by the proximal portion into a bore in the distal portion so that said tines are collapsed onto the fibre.

12. A method according to claim 9, further comprising the step of introducing the ferrule of the plug connector into one face of a rigid coupler, introducing the ferrule of a second plug connector identical to the first plug connector into the other face of said rigid coupler and fastening the first and second plug connectors to the coupler by means of clamping nuts, the ferrules abutting with their optical fibres aligned but not in contact.

* * * * *